INVENTORS
JAMES A. QUINN
STAMATES I. FRANSOULIS
BY Victor D. ...

United States Patent Office 2,990,116
Patented June 27, 1961

2,990,116
ELECTROMECHANICAL ANALOG INTEGRATING DEVICE
James A. Quinn, North Massapequa, and Stamates I. Frangoulis, Flushing, N.Y., assignors to Sperry Rand Corporation, Ford Instrument Company Division, Long Island City, N.Y., a corporation of Delaware
Filed June 24, 1957, Ser. No. 667,485
6 Claims. (Cl. 235—183)

This invention relates to analog integrating devices and more particularly to an improved electromechanical device for concurrently integrating analog data in a plurality of individual channels.

As is generally known, conventional integrating systems such as might be employed for navigational computation, normally incorporate individual devices, such as ball and disc integrators or rate generators, for each of the available channels of information. Such devices may overburden airborne equipment with weight when data in a plurality of informational channels has to be individually integrated.

A principal object of this invention is to provide a small and light weight device for concurrently integrating data from a plurality of informational channels.

In accordance with the present invention, equipment is provided to sample rapidly and periodically the analog voltages from individual informational channels. The successive voltage pulses from each channel successively displace individual mechanical counters by a driving shaft component of the equipment through selectively engaged clutches. When the time duration of each voltage pulse is accurately controlled, the desired integration data can be read directly from the counters with the incorporation of an appropriate scale factor for the selected rate of cycling. As contemplated by the invention, switching means are provided in synchronism with the sampling means for disengaging all counters except the selected one which is being displaced by a discrete pulse corresponding to a level of analog data in one informational channel. The analog data in each channel is integrated by sharing, on a time basis, common equipment for converting electrical signals into corresponding mechanical displacements of an indicator shaft. In one embodiment of the invention the displaced indicator shaft is returned to its zero reference position between successive informational pulses. In another embodiment of the invention, the effective utility of the integrator is improved by providing periodic and selective means for rapidly zero referencing the indicator shaft by a mechanical spring.

Other features and capabilities of the invention will be understood more clearly from the following detailed description taken in conjunction with the accompanying drawings in which:

FIGS. 6a and 6b are diagrams for illustrating the cofunctioning of the modified linear transformer as used in the embodiment of FIG. 3.

Figure 1:
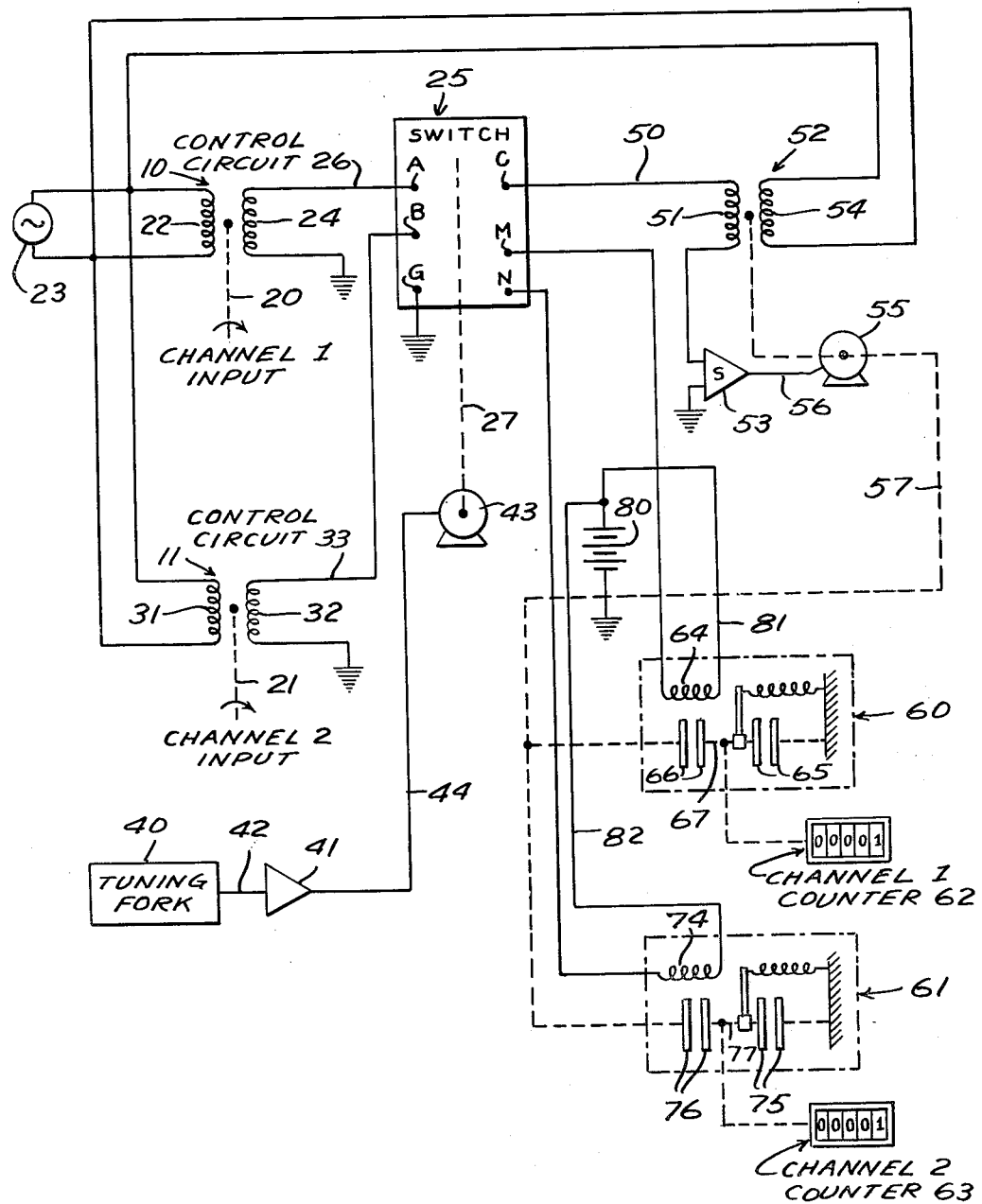
FIG. 1 is a schematic diagram of equipment and circuits for practicing the invention.

Referring to FIG. 1, the apparatus of the invention is illustrated as including linear transformers 10 and 11 having their respective control shafts 20 and 21 continually displaced by devices (not shown) in accordance with available analog data from informational channels 1 and 2. The linear transformer 10 has its input winding 22 connected across an A.C. source 23 and one terminal of its output winding 24 connected to a terminal A of a switch 25 by a conductor of a control circuit 26, the other terminal of the winding 24 and a terminal G of the switch 25 being grounded. The switch 25 is a motor driven cam or slip ring type of sequential switch having a control shaft 27 and its switching function will be explained later in conjunction with FIGS. 2a to 2f. The linear transformer 11 has its input winding 31 connected across the A.C. source 23 and one terminal of its output winding 32 connected to a terminal B of the switch 25 by a conductor of a control circuit 33, the other terminal of the winding 32 being grounded.

The driving of the control shaft 27 of the switch 25 is accurately controlled by a precision type of tuning fork 40 driving an amplifier 41 through a cable 42 connected therebetween. A timing motor 43 is connected to the output side of the amplifier 41 by a cable 44 and its shaft is operatively connected to drive the control shaft 27 of the switch 25.

A servo circuit 50 is connected from a terminal C of the switch 25 to ground, the terminal C being selectively connectable to the terminals A and B and G by the internal wiring of the switch 25. Servo circuit 50 includes in series connection an output winding 51 of a linear transformer 52 and the input side of a servo-amplifier 53, the linear transformer 52 having its input winding 54 connected across the A.C. source 23. The output side of servo-amplifier 53 is connected to a servomotor 55 by a cable 56 and the output shaft of the servo motor 55 is connected to a driving shaft 57 and to a controlling shaft of the linear transformer 52 for closing a servo nulling loop. Magnetic clutches 60 and 61 are operatively connected between the driving shaft 57 and counters 62 and 63, respectively, and these counters will integrate, with respect to time, the data in input channels 1 and 2. The clutch 60 comprises a solenoid coil 64 and a pair of spring loaded engaged pair of plates 65 serially connected to a pair of normally disengaged plates 66 by a shaft 67. One of the clutch input shafts associated with the plates 66 is connected to the driving shaft 57. The counter 62 is connected to the shaft 67 and the other shaft of the clutch 60 is fixed to a stationary frame of the equipment. Magnetic clutch 61 is similar to the clutch 60 and comprises a solenoid coil 74, a spring loaded pair of engaged plates 75, a normally disengaged pair of plates 76, and a shaft 77 connected between one plate of each pair of plates 75 and 76, the shaft 77 being connected to the counter 63. One side of a voltage source 80 is connected to one terminal of the solenoid coils 64 and 74 by conductors 81 and 82, respectively, the other side of source 80 being grounded. The other terminals of the solenoid coils 64 and 74 are connected to terminals M and N, respectively, of the switch 25, terminals M and N being selectively connectable to the terminal G by the internal wiring of the switch 25.

Figure 2:
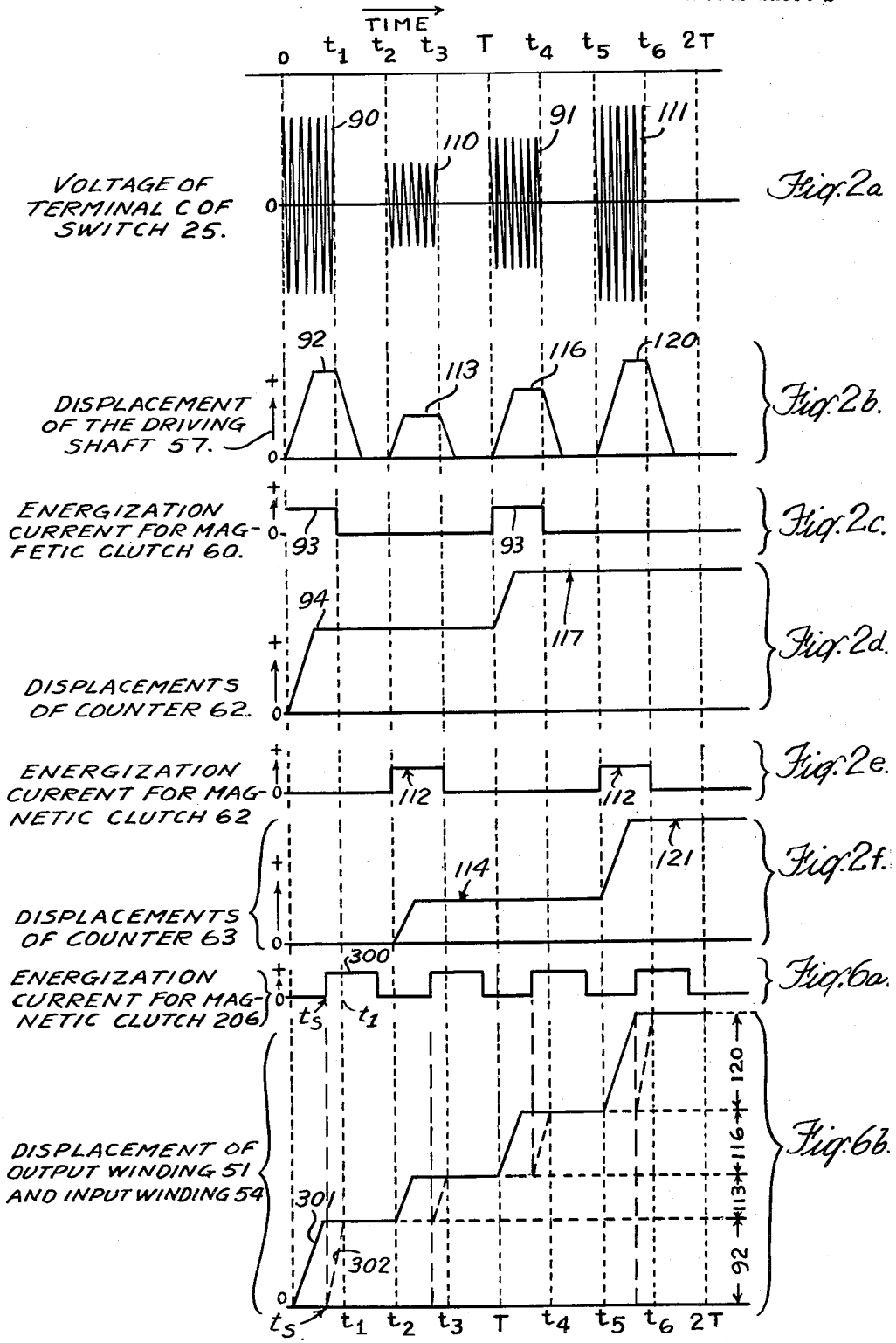
FIGS 2a to 2f are diagrams for illustrating the cofunctioning of the components employed in FIG. 1.

The switching functions performed by the switch 25 for effecting the time integrations of analog data in channels 1 and 2 by counters 62 and 63, respectively, will be explained in conjunction with the diagrams of FIGS. 2a, 2b, 2c, 2d, 2e and 2f in which time intervals 0 to T and T to 2T represent two successive cycles of the switch 25. In FIG. 2a is shown the voltage variations of the terminal C as the switch 25 samples voltages from the control circuit 26 through the terminal A during time intervals 0 to $t_1$ and T to $t_4$, the voltage variations being represented by curves 90 and 91, respectively. Also, FIG. 2a shows the voltage variations of the terminal C from the control circuit 33 through the terminal B driving time intervals $t_2$ to $t_3$ and $t_5$ to $t_6$, the voltage variations being represented by curves 110 and 111, respectively.

In FIGS. 2b, 2c, 2d, 2e and 2f are shown the displacements of the driving shaft 57, the energization current for the magnetic clutch 60, the displacements of the counter 62, the energization current for the magnetic clutch 61 and the displacements of the counter 63, respectively.

During time interval 0 to $t_1$, plates 66 of the clutch 60 are engaged by the energization current at level 93, plates 76 of the clutch 61 are disengaged, the driving shaft 57 is displaced from zero to level 92 by the servo loop function, and the counter 62 is driven to a displacement level 94. During time interval $t_1$ to $t_2$, the terminal C is connected to the terminal G, the clutch plates 66 are disengaged and the clutch plates 65 are engaged. Hence, the counter 62 remains at displacement level 94 while the shaft 57 is driven to its reference zero position by the servomotor 55 in the nulling servoloop. During time interval $t_2$ to $t_3$, plates 76 of the clutch 61 are engaged by the energization current at level 112, plates 66 of the clutch 60 remain disengaged, the shaft 57 is driven to a level 113 by the servomotor 55 in the closed servoloop, and the counter 63 is driven to a displacement level 114. During time interval $t_3$ to T, the terminal C is connected to the terminal G, the clutch plates 76 are disengaged and the clutch plates 75 are engaged. Hence, the counter 63 remains at displacement level 114 while the shaft 57 is driven to its reference zero position by the servomotor 55 in the nulling servoloop. During time interval T to $t_4$, plates 76 of the clutch 61 are disengaged, plates 66 of the clutch 60 are engaged by the energization current at level 93, the driving shaft 57 is driven from zero to a level 116 by the servomotor 55 in the closed servoloop and the counter 62 is displaced from its prior level at 94 to a level 117, the difference in displacement between levels 117 and 94 corresponding to the displacement of the driving shaft 57 from zero to level 116. During time interval $t_4$ to $t_5$, the terminal C is connected to the terminal G, the clutch plates 66 are disengaged and the clutch plates 65 are engaged. Hence, the counter 62 remains at level 117 while the shaft 57 is driven to its reference zero by the servomotor 55 in the nulling servoloop. During time interval $t_5$ to $t_6$, plates 76 of the clutch 61 are engaged by the energization current at level 112, plates 66 of the clutch 60 remain disengaged, the shaft 57 is driven from zero to a level 120 by the servomotor in the closed servoloop, the counter 63 is displaced from its prior level at 114 to a level 121, the difference in displacement between levels 121 and 114 corresponding to the displacement of the driving shaft 57 from zero to level 120. During time interval $t_6$ to 2T, the functions during time interval $t_3$ to T are repeated. As a consequence of the differential influence of linear transformers 10 and 52 in the input circuit of the nulling servoloop, the displacements of the shaft 57 during time intervals 0 to $t_1$ and T to $t_4$ are directly proportional to the level of voltage in control circuit 26 and the displacements of the shaft 57 during time intervals $t_2$ to $t_3$ and $t_5$ to $t_6$ are directly proportional to the level of voltage in the control circuit 33.

From the above explanation, it can be seen that when an appropriate scaling factor is incorporated in the counters, the analog data in channel 1 will be integrated by a direct reading of the counter 62 while the analog data in channel 2 will be integrated by a direct reading of the counter 63.

For the embodiment of the invention as shown in FIG. 1, it will be noted from the analysis of FIGS. 2a to 2f that the tuning fork 40, the timing amplifier 41, the timing motor 43, the linear transformer 52, the servomotor 55 and the servoamplifier 53 is time shared for the integrating operations of the data in channels 1 and 2. However, during approximately one half of each integrating cycle, such as the time intervals $t_1$ to $t_2$ and $t_3$ to T of the first cycle, none of the equipment is operatively employed for any of the input information as the shaft 57 is driven back to its reference zero position in preparation for the next active portion of the sampling cycle.

Figure 3:
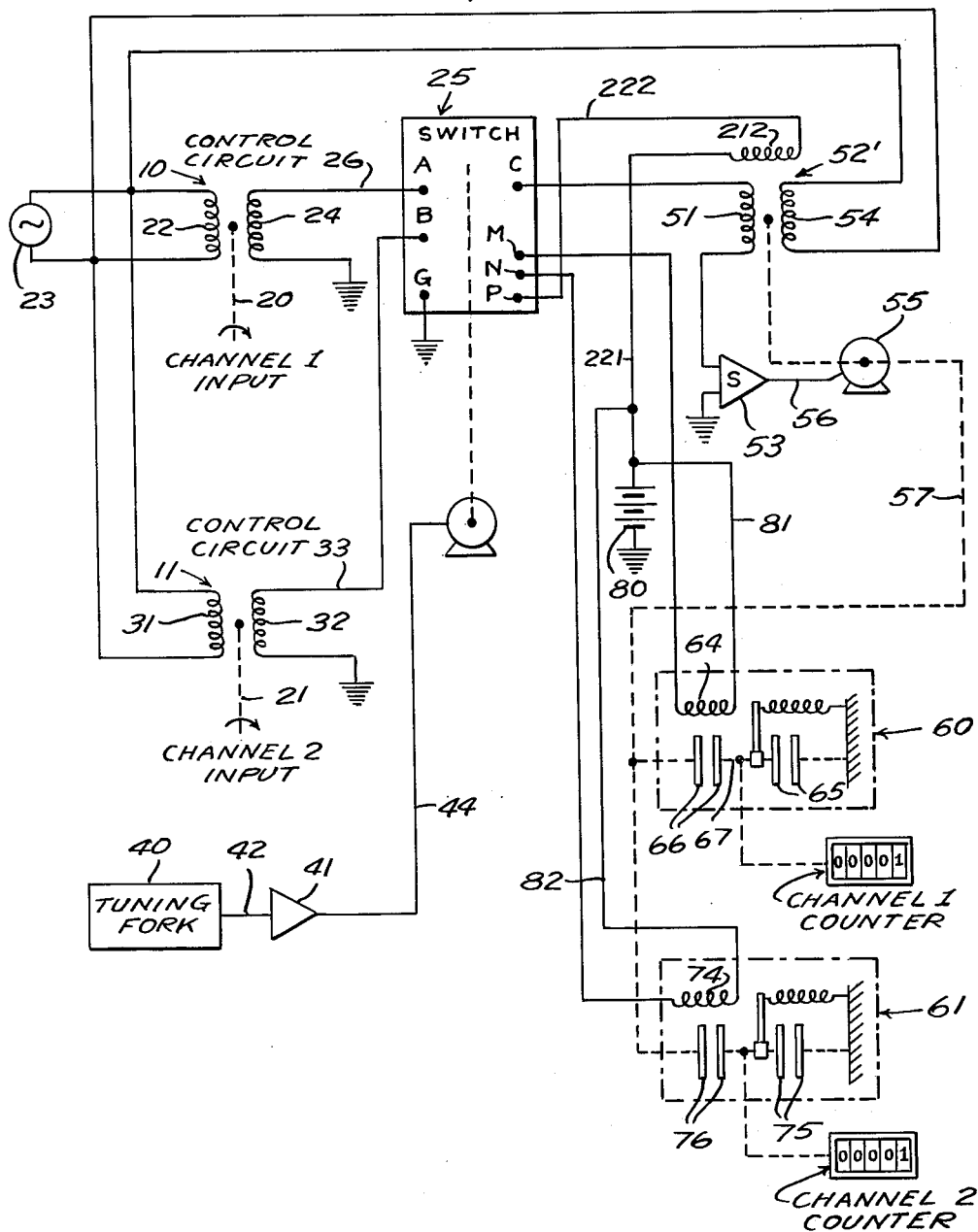
FIG. 3 is an improved modification of the embodiment shown in FIG. 1.

The effective utilization of equipment is improved in the embodiment of the invention which is shown in FIG. 3. Generally, the same components and connections are used as shown in FIG. 1 with the principal difference that a new and novel linear transformer 52 is substituted for the linear transformer 52'. Also the switch 25 is modified to add a new switching operation for the new linear transformer 52' and to omit the switching operation of connecting terminal C to ground for any portion of the sampling cycle.

Figure 4:
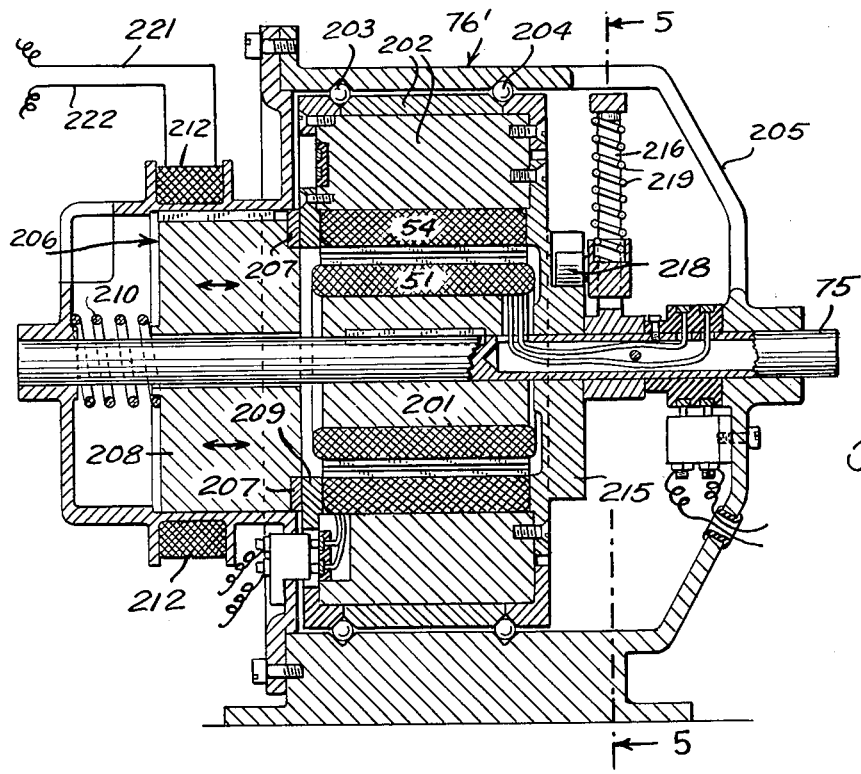
FIG. 4 is a cross sectional view of a modified linear transformer as used in FIG. 3.

In FIGS. 3 and 4, the linear transformer 52' includes the output winding 51 disposed upon a core structure 201 which is mounted on the shaft 57 and the input winding 54 disposed upon a cylindrical core structure 202 which is mounted on the inner races of ball bearings 203 and 204, the outer races of the ball bearings being secured to a fixed frame 205 of the linear transformer 52'. A spring loaded magnetic clutch 206 is disposed between the frame 205 and the core structure 202. The magnetic clutch 206 has a clutch plate 207 mounted on a magnetic core structure 208, the clutch plate 207 being forced against a clutch plate 209 which is mounted on the core structure 202. Clutch plates 207 and 209 are held in contact by a spring 210 in compression between the frame 205 and the magnetic core structure 208. A solenoid coil 212 is disposed on the frame 205 and is designed to disengage the clutch plates 207 and 209 when it is energized from a D.C. source such as the source 80.

Figure 5:
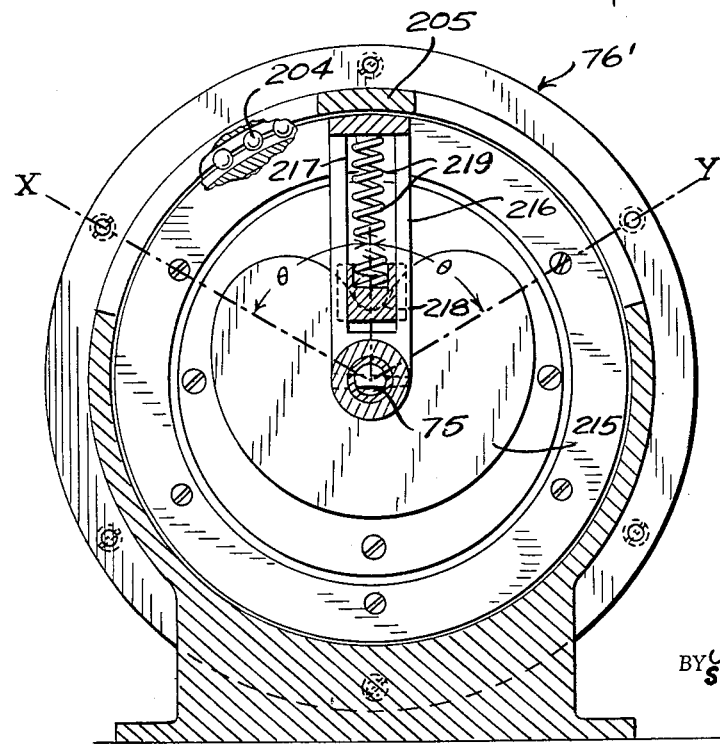
FIG. 5 is an elevation sectional view of FIG. 4 showing a spring loaded heart shaped cam mechanism.

A heart shaped cam 215, such as shown in FIG. 5, is mounted on the core structure 202 and a member 216 having a radial slot 217 is mounted on the shaft 57. The radial slot 217 guides a cam follower disposed in the radial slot 217 and a spring 219 in compression between the end of the member 216 and the cam follower 218 maintains the cam follower in forced contact with the surface of the cam 215. With selected components, any displacement of the shaft 57 between zero and the angular position of the maximum radii OX and OY of the cam 215 can effect a subsequent and similar displacement of the core structure 202 and the input coil 54. Such a follow-up displacement for the input coil 54 requires that the shaft 57 be held stationary before the solenoid coil 212 is energized.

In FIG. 3, the solenoid coil 212 of the linear transformer 52' is connected to the ungrounded side of the source 80 by a conductor 221 and to a terminal P on the switch 25 by a conductor 222, the terminal P being periodically connected to the grounded terminal G by the internally wiring of the switch for selectively energizing the solenoid coil 212 and, thereby, disengaging the clutch plates 207 and 209. The switching function of the switch 25 which is associated with the terminal P is shown in the diagram of FIG. 6a as a curve 300 for the cycling of energization current to the magnetic clutch 206. Switch 25 is normally designed to provide an internal connection between the terminals C and A for the entire time interval of 0 to $t_1$. At a time instant $t_s$ prior to instant $t_1$ but after the shaft 57 has reached its displacement level 92, the terminal P is connected to the terminal G for the time interval $t_5$ to $t_1$. As shown by a curve 301 in FIG. 6b, the output winding 51 of the linear transformer 52' is disposed to level 92 during the time interval 0 to $t_s$ while the input coil 54 is held stationary by the spring loaded magnetic clutch 206. In the time interval $t_s$ to $t_1$, the heart shaped cam 215 and associated components thereto effect a follow-up displacement of the input coil 54, as shown by a curve 302, to displacement level 92 when the magnetic clutch is energized by the current as represented by the curve 300 in FIG. 6a. Similar follow-up displacements of the input coil 54 to the output coil 52 occur near time instances $t_3$, $t_4$ and $t_6$ as shown in FIG. 6b. As a consequence of the very rapid actions effected by spring actuated devices in comparison to the time required for servoloop operations, it will be apparent to those skilled in the art that the time interval during which equipment is not effectively usable for each reduced from time interval $t_1$ to $t_2$ for the embodiment shown in FIG. 1 to time interval $t_s$ to $t_1$ for the embodiment shown in FIG. 3. Hence, the common equipment shown in FIG. 3 can process more input channels of information than similar common equipment as shown in FIG. 1.

It is to be understood that various modifications of the invention other than those above described may be effected by persons skilled in the art without departing from the principle and scope of the invention as defined in the appended claims.

What is claimed is:

1. An analog integrating device comprising a plurality of control circuits adapted to receive A.C. signals, a driving shaft, a plurality of mechanically actuated counters one of which is associated with each of said control circuits, a plurality of clutches one of which is interposed between the said driving shaft and each of said counters, means connected to said driving shaft for successively displacing the said driving shaft in accordance with the magnitude of successive pulses of A.C. signals, switching means disposed between said plurality of control circuits and said displacing means for selectively connecting said displacing means to one of each said control circuits during a discrete interval of time, means for selectively engaging one of the said clutches during said discrete interval of time and disengaging said one of said clutches subsequent to the discrete interval of time, and means included in said switching means operative to connect automatically and successively the said displacing means to each of the other of the said control circuits and said switching and clutch engaging means include a timing A.C. source, a timing motor connected across said timing A.C. source, said switching and clutch engaging means being operatively controlled by said timing motor.

2. An analog integrating device as claimed in claim 1 wherein said displacing means includes a linear transformer having a control shaft, an A.C. source connected across the input side of said linear transformer, a differential circuit connected to said switching means and including a servoamplifier connected at its input side in series with the said linear transformer, a servomotor connected to said servoamplifier, the shaft of said servomotor being coupled in driving relation to said control shaft and said driving shaft, and means in said switching means operative to short circuit said differential circuit subsequent to said discrete interval of time.

3. An analog integrating device as claimed in claim 1 wherein said displacing means includes a linear transformer having a control shaft and a rotatable stator, an A.C. source connected across the input side of said linear transformer, a differential circuit connected to said switching means and including a servoamplifier connected at its input side in series connection with the said linear transformer, a servomotor connected in driven relationship to said servoamplifier, the shaft of said servomotor being coupled in driving relation to said control shaft and said driving shaft, clutching means for immobilizing said stator during said discrete interval of time and releasing said stator subsequent to said discrete interval of time, and means connected between said control shaft and said stator for providing a resisting torque to displacements therebetween.

4. An analog integrating device as claimed in claim 3 wherein said resisting torque means includes a heart shaped cam fixed to said stator, a member fixed to said control shaft and having a slot extending in a radial direction from said control shaft, a cam follower disposed in the radial slot of said member, a spring and means disposing said spring between said cam follower and said member for pressing said cam follower against said cam.

5. An analog integrating device as claimed in claim 4 wherein said automatic switching means include a timing A.C. source, a timing motor connected across said timing A.C. source and means for operatively controlling said switching means, said engaging means and said clutching means by said timing motor.

6. An analog integrating device as claimed in claim 1 wherein each of said control circuits includes a linear transformer having an input shaft settable in accordance with analog data and an A.C. source connected across the input side of said linear transformer, said linear transformer being connected to its output side to said switching means.

References Cited in the file of this patent

UNITED STATES PATENTS

| | | |
|---|---|---|
| 1,185,736 | Trood | June 6, 1916 |
| 1,909,724 | Schellentrager | May 16, 1933 |
| 2,610,843 | Schellentrager | Sept. 16, 1952 |
| 2,706,812 | Dinlocker | Apr. 19, 1955 |
| 2,736,201 | Ohlsen et al. | Feb. 28, 1956 |